(12) United States Patent
Safai (10) Patent No.: US 12,098,915 B2
(45) Date of Patent: Sep. 24, 2024

(54) UNDER WATER PLASMA ELASTICS WAVE GAP MEASURING

(71) Applicant: The Boeing Company, Chicago, IL (US)

(72) Inventor: Morteza Safai, Seattle, WA (US)

(73) Assignee: THE BOEING COMPANY, Arlington, VA (US)

( * ) Notice: Subject to any disclaimer, the term of this patent is extended or adjusted under 35 U.S.C. 154(b) by 384 days.

(21) Appl. No.: 17/711,346

(22) Filed: Apr. 1, 2022

(65) Prior Publication Data

US 2023/0314129 A1  Oct. 5, 2023

(51) Int. Cl.
  *G01B 17/00* (2006.01)
  *G01N 3/307* (2006.01)
(52) U.S. Cl.
  CPC .............. *G01B 17/00* (2013.01); *G01N 3/307* (2013.01)
(58) Field of Classification Search
  CPC ...................................................... G01B 17/00
  See application file for complete search history.

(56) References Cited

U.S. PATENT DOCUMENTS

| 11,953,471 B2* | 4/2024 | Safai ...................... G01N 3/307 |
| 2014/0060193 A1 | 3/2014 | Zhu et al. |
| 2021/0341428 A1 | 11/2021 | Ashrafi |

FOREIGN PATENT DOCUMENTS

JP  H01224610 A  9/1989

OTHER PUBLICATIONS

Extended European Search Report issued on Sep. 7, 2023 in corresponding European Application No. 23164718.1, 7 pages.

* cited by examiner

*Primary Examiner* — Walter L Lindsay, Jr.
*Assistant Examiner* — Andrew V Do
(74) *Attorney, Agent, or Firm* — MH2 Technology Law Group LLP

(57) ABSTRACT

A system and method for determining a width of a gap in a structure is provided. The system uses an underwater spark discharge to generate a compression wave in a first vessel containing a liquid. The system further includes a second vessel in which a vacuum is pulled to hold the first vessel against the structure. The compression wave is directed to propagate from the liquid into the structure and is detected after it propagates through the structure including the gap.

20 Claims, 6 Drawing Sheets

UNDER WATER PLASMA ELASTICS WAVE GAP MEASURING

FIELD OF THE DISCLOSURE

The present disclosure is directed to systems and methods for determining a width of a gap in a structure. More particularly, the present disclosure is directed to systems and methods for determining a width of a gap in composite structures using a compression wave generated by an underwater spark discharge and subsequent detection of the compression wave.

BACKGROUND

Carbon fiber reinforced polymers (CFRP) are often used for applications requiring extremely strong and lightweight materials, for example, high performance automobiles, aircraft, and space components. A structure formed of CFRP can include a gap when multiple work piece sections are joined to form the structure. Currently, high frequency x-ray methods have difficulty determining the width of the air gap. Therefore, a non-destructive system and method for determining the width of a gap in a structure is desired.

SUMMARY

According to the present disclosure, a system for measuring a gap width in a structure is provided. The system includes a first vessel comprising one or more sidewalls and an endwall, a liquid port configured to connect to a source to fill the first vessel with a liquid, and an open portion configured to be placed against a structure. The system also includes a second vessel surrounding the first vessel, comprising a vacuum port configured to connect to a vacuum system to pull a vacuum in a space between an outer surface of the first vessel and an inner surface of the second vessel when the open portion of the first vessel and an open portion of the second vessel are adjacent to the structure. The system further includes, a pair of electrodes disposed within the first vessel, a power supply connected to the pair of electrodes, wherein the power supply is configured to provide an electrical pulse to create an underwater plasma between the pair of electrodes to generate a compression wave. Additionally, the system includes, a first ultrasonic detector configured to detect generation of the compression wave, a second ultrasonic detector positioned in a pitch-catch orientation with the pair of electrodes and the structure, a third ultrasonic detector positioned in a pulse-echo orientation with the pair of electrodes and the structure; and a synchronization circuit configured to synchronize the electrical pulse and the first, second, and third ultrasonic detectors.

According to the present disclosure, a method for determining a gap width in a structure is provided. The method includes placing an open portion of a first vessel against the structure, pulling a vacuum between an outer surface of the first vessel and an inner surface of a second vessel that encloses the first vessel, wherein pulling the vacuum seals the first vessel to the structure, and filling the first vessel with a liquid, wherein the liquid contacts a surface of the structure at the open portion. The method also includes initiating a spark discharge in the liquid to form a plasma that generates a compression wave in the liquid, wherein the compression wave propagates from the liquid into the structure through the open portion. The method further includes detecting, by a first ultrasonic transducer, generation of the compression wave, detecting, by a second ultrasonic transducer, the compression wave subsequent to the compression wave passing through a first portion of the structure, a second portion of the structure, and a gap between the first portion and the second portion of the structure, and detecting, by a third ultrasonic transducer, the compression wave subsequent to reflection from the gap between the first portion and the second portion of the structure. Additionally, the method includes determining the gap width from detection of the compression wave by one or more of the first, second, and third ultrasonic transducers.

According to the present disclosure a system for measuring a gap width in a composite material is provided. The system includes a first vessel comprising, one or more sidewalls and an endwall, a liquid port configured to connect to a source to fill the first vessel with a liquid, and an open portion configured to be placed against a composite material to be inspected. The system also includes a second vessel surrounding at least a portion of the first vessel, the second vessel comprising a vacuum port configured to connect to a vacuum system to pull a vacuum in a space between an outer surface of the first vessel and an inner surface of the second vessel when the open portion of the first vessel and an open portion of the second vessel are aligned to be placed against a surface of the composite material. The system further includes a pair of electrodes disposed within the first vessel and positioned to generate a compression wave in the liquid within the first vessel directed towards the composite material when supplied with an electrical pulse from a power supply, a first ultrasonic transducer for detecting generation of the compression wave; a second ultrasonic transducer for detecting the compression wave subsequent to the compression wave passing through a cross-section of the composite material, and a third ultrasonic transducer for detecting reflection of the compression wave from an interface between a portion of the composite material and an air gap within the composite material. Additionally, the system includes, a synchronization circuit configured to synchronize generation of the compression wave and detection of the compression wave by the first, second, and third ultrasonic transducers, and a computing system comprising at least one processor, a memory including instructions for the at least one processor, one or more input/output devices; and a bus connecting the memory and the one or more input/output devices with the at least one processor, wherein the instructions configure the computing system to calculate the gap width based on signals detected by the first, second, and third ultrasonic transducers.

It is to be understood that both the foregoing general description and the following detailed description are exemplary and explanatory only and are not restrictive of the present teachings, as claimed.

BRIEF DESCRIPTION OF THE DRAWINGS

The accompanying drawings, which are incorporated in and constitute a part of this specification, illustrate aspects of the present teachings and together with the description, serve to explain the principles of the present teachings.

It should be noted that some details of the figures have been simplified and are drawn to facilitate understanding rather than to maintain strict structural accuracy, detail, and scale.

DESCRIPTION

Reference will now be made in detail to the present teachings, examples of which are illustrated in the accompanying drawings. In the drawings, like reference numerals have been used throughout to designate identical elements. In the following description, reference is made to the accompanying drawings that form a part thereof, and in which is shown by way of illustration specific examples of practicing the present teachings. The following description is, therefore, merely exemplary.

The present disclosure is directed to a system and method that uses an underwater plasma to generate a compression wave to determine a gap width in a structure. Compression waves are also referred to herein as stress waves or longitudinal waves. The system includes a first vessel containing a liquid in which an underwater plasma generates a compression wave. The compression wave propagates from the liquid into a first workpiece and is detected after it propagates through the first workpiece, a second workpiece, and a gap between the first and the second workpieces. The compression wave also propagates through the first workpiece and reflects one or more times from the interface between the first workpiece and the gap before being detected. The compression wave is further detected at the time of generation, thus providing three detected signals from which the gap width can be determined. Although described herein with reference to an air gap between two adjacent composite workpieces forming a composite structure, one of ordinary skill in the art will understand that the system and method can also be used to determine a gap width in structures formed by other materials, as well as a gap filled with a material or another substance besides air. The disclosed system provides a lightweight, low cost, mobile instrument that can nondestructively determine a gap width in a structure without the health hazards and complex equipment associated with x-rays.

Figure 1A:
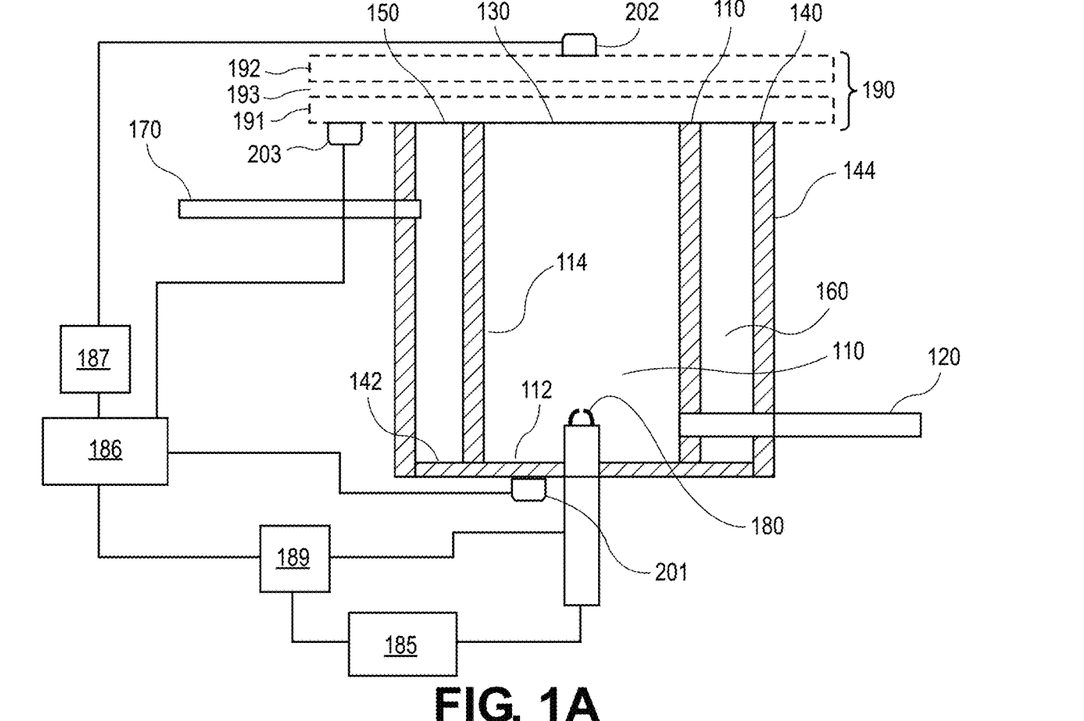
FIG. 1A schematically illustrates a cross-sectional view of a system for determining the width of a gap in a structure, according to an implementation.
Figure 1B:
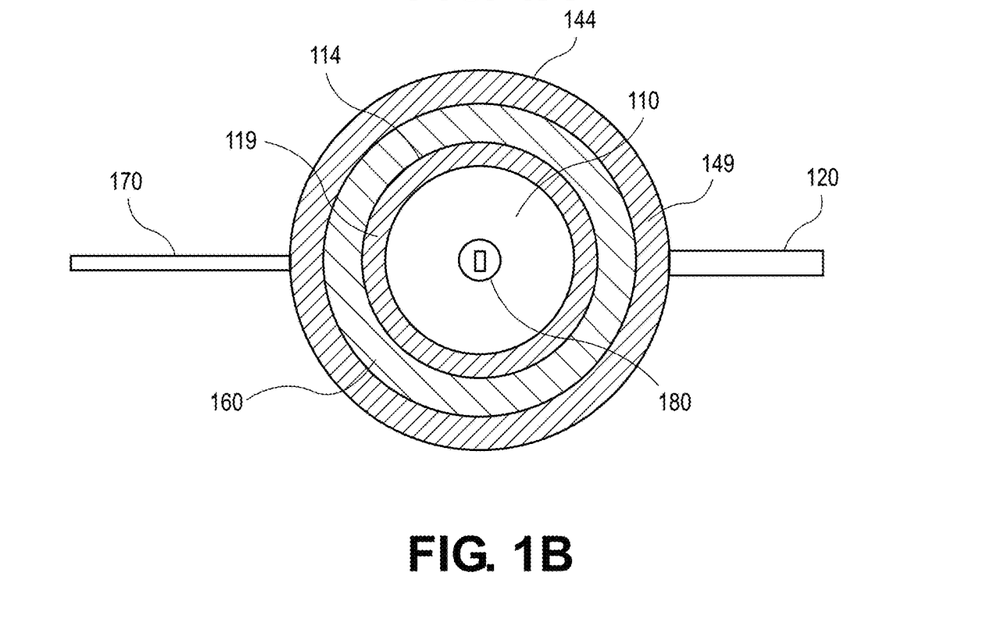
FIG. 1B schematically illustrates an end view of a system for determining the width of a gap in a structure, according to an implementation.

FIGS. 1A-B illustrate schematic views of a system 100 for determining the width of a gap in a structure, according to an implementation. As shown in the cross-sectional schematic view of FIG. 1A, system 100 includes a first vessel 110 having an endwall 112, one or more sidewalls 114, and an open portion 130 opposite endwall 112. Open portion 130 can be an entire wall (e.g., an endwall) opposite endwall 112 or be a portion of the wall opposite endwall 112. First vessel 110 further includes a liquid port 120 that can be used to fill the first vessel with a liquid 125 when connected to a source of liquid. As will be discussed in more detail below, first vessel 110 functions to contain the liquid and open portion 130 allows the liquid to contact a structure including a gap. A structure 190 shown in FIG. 1A can be, for example, a structure formed by a first workpiece 191, a second workpiece 192, and a gap 193 separating first workpiece 191 and second workpiece 192. For example, gap 193 can be an air gap between two adjacent CFRP workpieces that form at least a portion of the composite structure. Gap 193 can have a width, for example, of about 25 microns to about 250 microns.

System 100 also includes a second vessel 140 having one or more sidewalls 144, an endwall 142, an open portion 150, and a vacuum port 170 that can be connected to a vacuum system. Second vessel 140 surrounds open portion 130 of first vessel 110 and may completely enclose first vessel 110 as shown in FIG. 1A. This allows a vacuum to be pulled in a space 160 between an outer surface of first vessel 110 and an inner surface of second vessel 140 when system 100 is placed in contact with structure 190.

FIG. 1B shows an end view of system 100, specifically the end including the open portions that contact structure 190. During operation of system 100, structure 190 is positioned over open portion 130 of first vessel 110 and open portion 150 of second vessel 140. First vessel 110 is filled with the liquid through liquid port 120 and a vacuum is pulled within space 160 via vacuum port 170. The liquid serves to couple a compression wave generated in the liquid into first workpiece 191. The vacuum serves to hold system 100 against first workpiece 191 and the keep the liquid from leaking out. To keep the liquid within first vessel 110 from leaking and to facilitate establishing a vacuum in space 160, a seal 119 can optionally be included at an end of sidewall 114 adjacent to open portion 130 of first vessel 110. Similarly, a seal 149 can optionally be included at an end of sidewalls 144 adjacent to open portion 150 of second vessel 140. Although depicted as cylindrical in shape, one of ordinary skill in the art will understand that other shapes can be used, in particular, shapes that focus the compression wave towards structure 190.

Figure 1C:
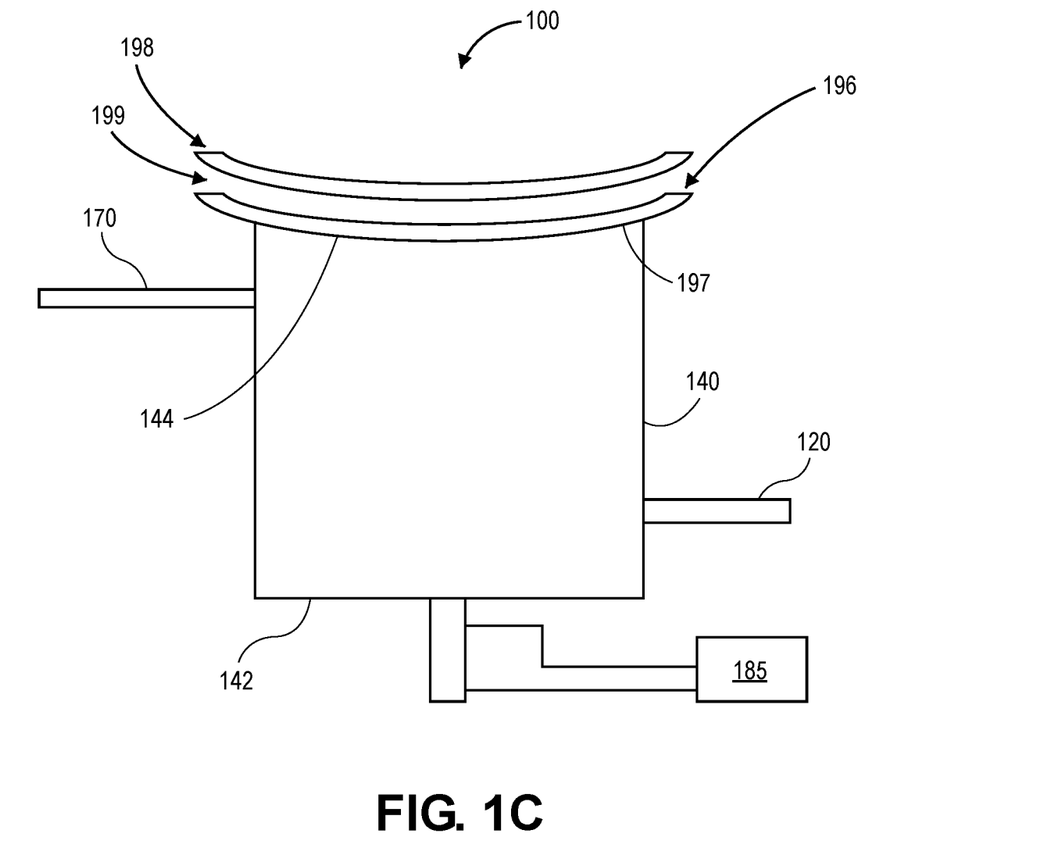
FIG. 1C schematically illustrates a side view of a system for determining a gap width in structure having a curved surface, according to another implementation.

End of sidewall 114 at open portion 130 is depicted in FIG. 1A to allow positioning on structure 190 having a flat surface. A workpiece including a curved or shaped surface can inspected by conforming ends of sidewalls of first vessel 110 and second vessel 140 to have a shape or curvature that matches a shape or curvature of the surface of the workpiece forming the structure being inspected. As shown in FIG. 1C, a structure can include a first workpiece 196 having a surface 197 that is shaped or curved, a second workpiece 198, and a gap 199 between first workpiece 196 and second workpiece 198. In this case, an end of sidewall 144 of second vessel 140 can have a shape or curvature that matches the shape or curvature of surface 197 of first workpiece 196. Similarly, an end of sidewall 114 of first vessel 110 can have a shape or curvature that matches a shape or curvature of surface 197. Ends of the sidewalls that match the shape or curvature of the surface of the structure being inspected allows first vessel 110 to be filled with the liquid without leakage and allows the vacuum to be pulled in space 160 between first vessel 110 and second vessel 140. This can optionally be accomplished by seals 119 and 149 being flexible to conform to a curvature and/or shape of the structure being inspected. One of ordinary skill in the art will understand that surface 197 that is shaped or curved may affect propagation of the compressive wave from the liquid in first vessel 110 into structure 190 and that the pulse amplitude and/or pulse width of the compressive wave may need to be adjusted.

Referring back to FIG. 1A, system 100 further includes a pair of electrodes 180 disposed in first vessel 110 and a power supply 185 connected to pair of electrodes 180. As used herein, pair of electrodes refers to an anode and a cathode separated by a gap. Pair of electrodes 180 can be, for example, part of a spark plug, e.g., a spark plug for a combustion engine. Pair of electrodes 180 are positioned so that the compression wave generated in the liquid can propagate towards the structure being inspected. For example, pair of electrodes 180 can be positioned in front of open portion 130 of first vessel 110 so that the compression wave can propagate through open portion 130 into the structure being inspected. Power supply 185 supplies an electrical pulse to initiate the spark discharge at electrodes 180. The electrical pulse generates a compression wave. Power supply 185 can provide about 10 kV to about 60 kV to pair of electrodes 180 and can be, for example, one or more banks of capacitors. The one or more banks of capacitors can be variable capacitors including time delay capability. Power supply 185 can also provide a voltage (e.g., and electrical pulse) via a transformer to produce arcing at pair of electrodes 180 at a desired voltage. Examples of transformers include, but are not limited to, an oscillator transformer and flyback transformer. Power supply 185 can also be a Van de Graaff belt high voltage electrostatic generator or other sources of an electrical pulse.

System 100 further includes a first ultrasonic detector 201, a second ultrasonic detector 202, and a third ultrasonic detector 203. Ultrasonic detectors are also referred to herein as ultrasonic sensors and can be, for example, piezoelectric ultrasonic transducers or other ultrasonic sensors known in the art. First ultrasonic detector 201 is positioned so that it can detect generation of a compression wave. Although shown in FIG. 1A positioned on endwall 112 of first vessel 110, one of ordinary skill in the art will understand that first ultrasonic detector 201 can be positioned in any location that allows detection the compression wave at the time of generation.

Second ultrasonic detector 202 is positioned to detect the compression wave after it passes through structure 190. As shown in FIG. 1A, second ultrasonic detector 202 is positioned to detect the compression wave after it propagates through first workpiece 191, gap 193, and second workpiece 192 without reflection. Positioning of second ultrasonic detector 202 relative to electrodes 180 that generate the compression wave is also referred to herein as pitch-catch as known in the art.

Third ultrasonic detector 203 is positioned on a surface of structure 190. As shown in FIG. 1A, third ultrasonic detector 203 is positioned on a surface of first workpiece 191 to detect the compression wave after it propagates through first workpiece 191 and reflects one or more times from the interface between air gap 193 and first workpiece 191. Positioning of third ultrasonic detector 203 relative to electrodes 180 that generate the compression wave is also referred to herein as pulse-echo as known in the art.

System 100 further includes a synchronization circuit 186, a waveform capture display 187, and driver 189. Synchronization circuit 186 controls waveform capture display 187 and driver 189 to synchronize generation of the compression wave and data capture by first, second, and third ultrasonic detectors 201, 202, and 203, such as for example ultrasonic transducers. To accomplish this, synchronization circuit 186 gates data acquisition including sampling frequencies, compression wave generation, and/or the time of travel of the compression wave. Gating of signals allows determination of the amount of time it takes for the compression wave to travel before being detected by first, second, and third ultrasonic detectors 201, 202, and 203. Waveform capture display 187 provides a visual representation of the compression wave detected by second ultrasonic detector 202. The visual representation of the compression wave shown on waveform capture display 187 shows when the compression wave entered and left first workpiece 191, entered and left gap 193, and entered and left second workpiece 192. Synchronization circuit 186 and waveform capture display 187 can be, for example, the synchronization circuit and waveform capture display that are commonly found in digital oscilloscopes. Synchronization circuit 186 can also be, for example, a phased array instrument used in conjunction with computer display acting as the waveform capture display.

Knowing the time and speed at which the compression wave travels in the material forming structure 190 and the thickness of first workpiece 191 and second workpiece 192, allows determination of the thickness of gap 193 by, for example, a computing system. The computing system can include, for example, at least one processor, a memory including instructions for the at least one processor, one or more input/output devices, and a bus connecting the memory and the one or more input/output devices with the at least one processor, wherein the instructions configure the computing system to calculate the gap width based on signals detected by the first, second, and third ultrasonic transducers. Examples of computing system include a laptop or desktop computer.

Figure 1D:
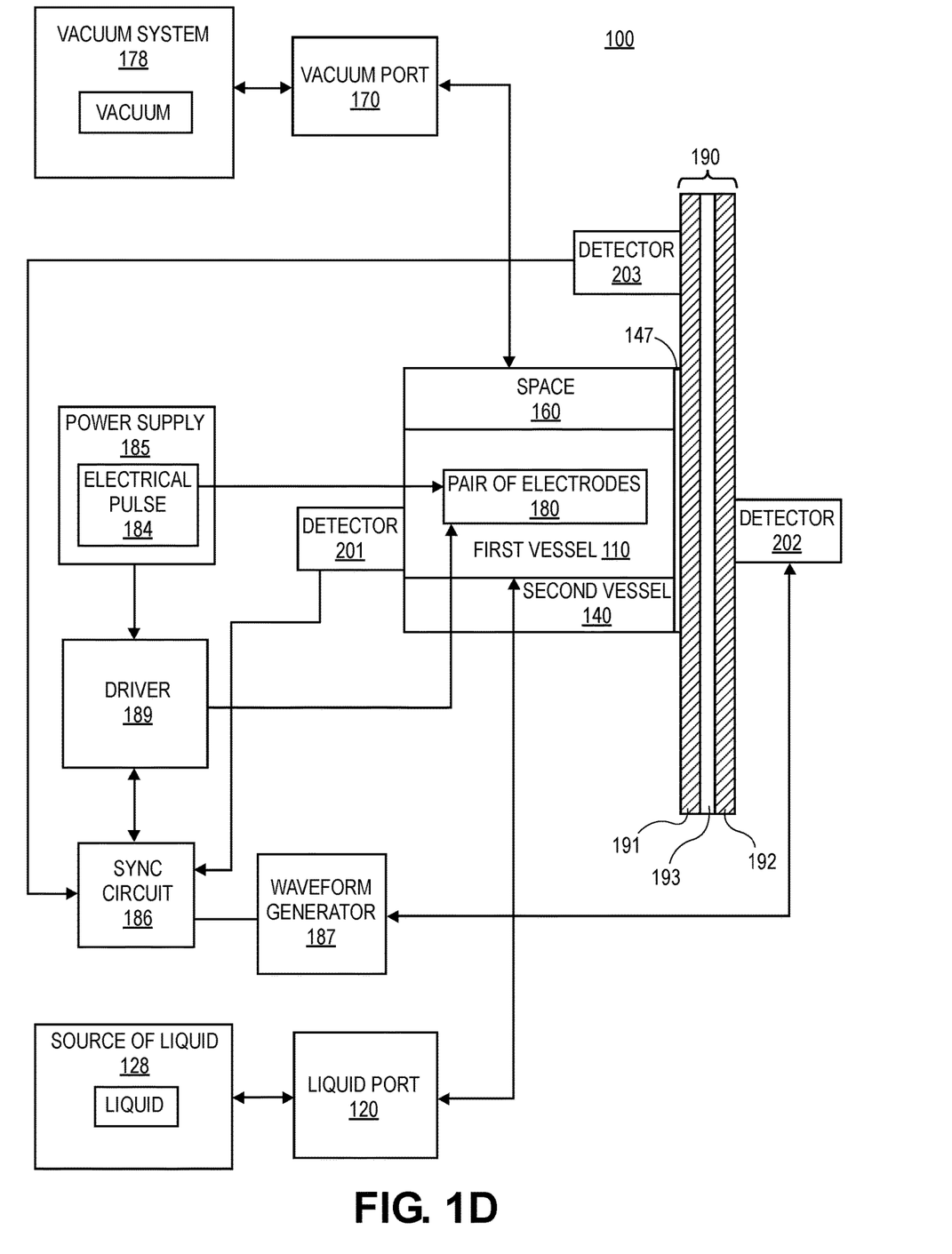
FIG. 1D is a functional block diagram of a system for determining the width of a gap in a structure.

FIG. 1D is a function block diagram of an example system 100 that uses an underwater plasma to generate a compression wave to determine a gap width in a structure. System 100 is placed adjacent to structure 190 that includes first workpiece 191, second workpiece 192, and gap 193 between first workpiece 191 and second workpiece 192. A vacuum system 178 can pull a vacuum in second vessel 140 via vacuum port 170. The vacuum secures system 100 against a surface of structure 190 and seals 147 prevent loss of vacuum from space 160. A source of liquid 128 can fill first vessel 110 with a liquid via liquid port 120. Seals 147 can prevent the liquid from leaking out of first vessel 110 to avoid the presence of an air gap/pocket in first vessel 110 that could affect propagation of the compressive wave into bonded structure 190. Power supply 185 can provide an electrical pulse to pair of electrodes 180 that results in a spark discharge that generates a plasma between pair of electrodes 180. The spark discharge generates a compression wave that propagates from the liquid into structure 190. Synchronization circuit 186 (shown as Sync Circuit 186 in FIG. 1D) controls waveform capture display 187 and driver 189 to synchronize and gate generation of the compression wave and data capture by first, second, and third ultrasonic sensors 201, 202, and 203. First ultrasonic detector 201 is positioned so that it can detect generation of the compression wave. Second ultrasonic detector 202 is positioned to detect the compression wave after it passes through structure 190 without reflection. Third ultrasonic detector 203 is positioned on a surface of first workpiece 191 to detect the compression wave after it propagates through first workpiece 191 and reflects one or more times from the interface between air gap 193 and first workpiece 191. Subsequent to detection of the compression wave at the detectors, the width of gap width in the structure can be determined from the time and speed at which the compression wave traveled in the materials of structure including the gap.

Figure 2:
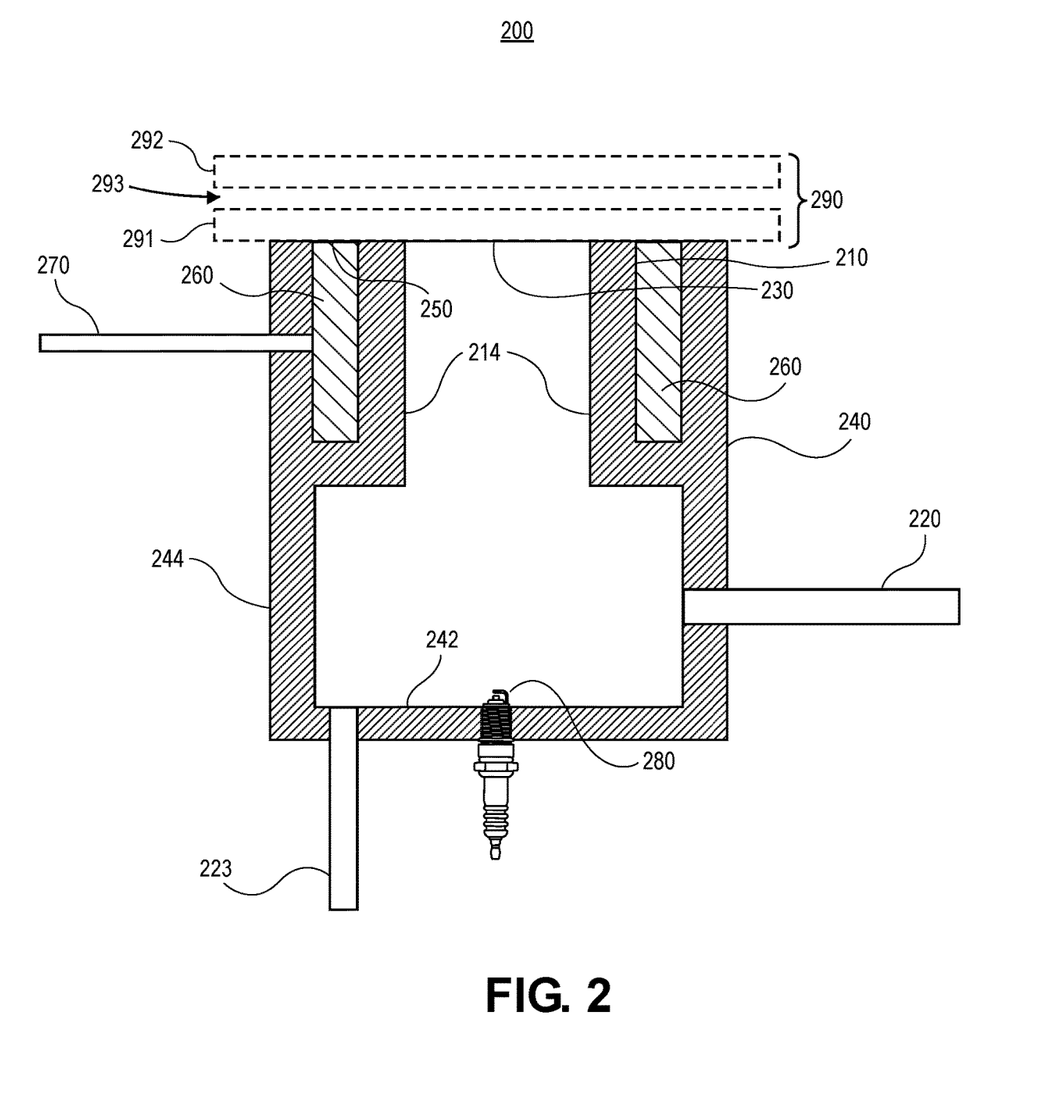
FIG. 2 schematically illustrates a cross-sectional view of a system for determining the width of a gap in a structure, according to another implementation.

The configuration of the first and second vessels can vary, for example, to share side walls and/or endwalls. FIG. 2 illustrates a cross-sectional view of a system 200 for determining a gap width in a structure in which a first vessel and a second vessel share common sidewalls and/or a common endwall, according to another implementation. System 200 includes a second vessel 240 having one or more sidewalls 244, an endwall 242, and an open portion 250 opposite endwall 242. Second vessel 240 also includes a vacuum port 270 that can pull a vacuum in space 260 when connected to a vacuum system. System 200 also includes a first vessel 210 having an endwall 242, one or more sidewalls 214, 244, and an open portion 230 that is opposite endwall 242. First vessel 210 further includes a liquid port 220 that can fill the first vessel with a liquid when connected to a source of liquid. First vessel 210 can optionally include an air vent 223 to remove air, for example in the form of bubbles, when first vessel 210 is filled with the liquid.

As shown in FIG. 2, second vessel 240 and first vessel 210 share endwall 242. Second vessel 240 also shares a portion of sidewall 244 with first vessel 210. In other words, endwall 242 functions as an endwall for both first vessel 210 and second vessel 240. Similarly, sidewall 244 functions as a sidewall for second vessel 240 and a portion of sidewall 244 also functions as a side wall for first vessel 210. Because second vessel 240 has a smaller volume, pulling a vacuum to seal system 200 to structure 290 requires removal of less air compared to a vessel with a larger volume.

During gap width determination, a structure 290 is placed over open portion 230 of first vessel 210 and open portion 250 of second vessel 240. Structure 290 includes a first workpiece 291, a second workpiece 293, and a gap 292 therebetween. First vessel 210 is filled with the liquid through liquid port 220 and a vacuum is pulled within space 260 via vacuum port 270. Optionally seals (not shown in the FIG. 2) can be located at the ends of the sidewalls that contact structure 290 can keep the liquid within first vessel 210 from escaping and facilitate establishing a vacuum in space 260. Pair of electrodes 280, for example, part of a spark plug, immersed in the liquid are provided with an electrical pulse. The electrical arc formed between pair of electrodes 280 generates a plasma within the liquid that in turn generates a compression wave directed towards structure 290 through open portion 230 of first vessel 210.

Figure 3:
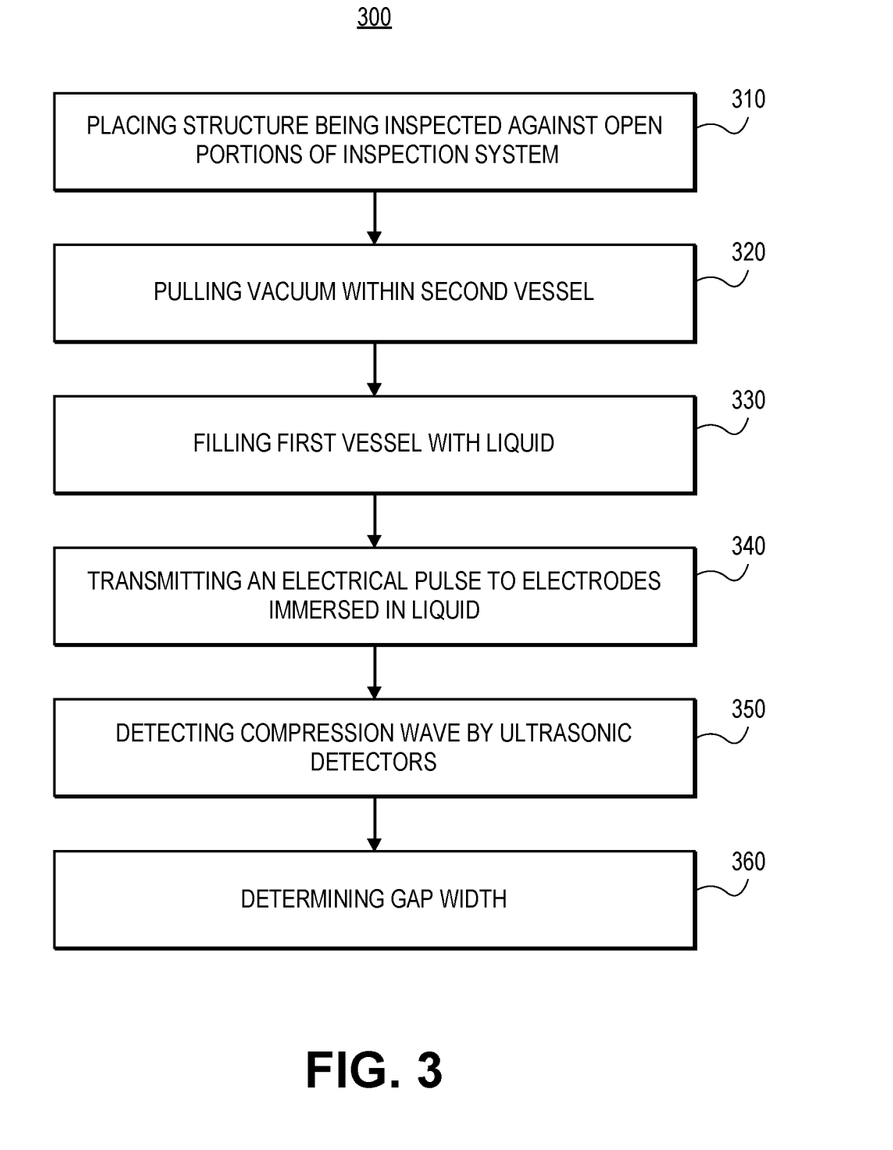
FIG. 3 is a flowchart of a method for determining the width of a gap in a structure, according to an implementation.

FIG. 3 is a flowchart illustrating a method for 300 for determining a gap width in a structure, according to an implementation.

Method 300 begins by placing a structure being inspected against the open portions of an inspection system as disclosed herein. Referring to FIG. 1A, system 100 can be placed against a structure 190. Structure 190 can be, for example, a structure formed by first workpiece 191 and second workpiece 192 separated by gap 193. As will be appreciated, structure 190 can include additional workpieces, but for simplicity, only two workpieces are illustrated. In some examples, first workpiece 191 and second workpiece 192 are made at least partially from CFRP. In other examples, first workpiece 191 is made at least partially from CFRP, and second workpiece 192 is made at least partially from metal. Gap 193 can be, for example, an air gap.

System 100 is placed against structure 190 so that open portions of first vessel 110 and second vessel 140 are closed by structure 190. In other words, structure 190 closes open portions of first vessel 110 to allow liquid to fill first vessel 110 and to contact a surface of structure 190. Structure 190 also closes open portions of second vessel 140 to allow a vacuum to be pulled in second vessel 140, for example, in space 160 between the inside of a sidewall of second vessel 140 and an outside of a sidewall of first vessel 110.

Method 300 continues at 320, by pulling a vaccum within second vessel 140.

Referring to FIG. 1A, the vacuum is pulled in space 160 of second vessel 140 via a vacuum port 170 connected to a vacuum system. The vacuum holds first vessel 110 and second vessel 140 against structure 190 to create a watertight chamber within first vessel 110 and to keep system 100 from moving during gap width determination, for example, when a compression wave is generated. The vacuum also enables system 100 to be placed in various orientations where system 100 can be held against structure 190 by the vacuum, for example, where structure 190 includes a vertical or angled surface to be inspected. Seals, sealant materials, or gaskets can be disposed between ends of the sidewalls adjacent to the open portions and structure 190 to assist pulling and retaining the vacuum and/or to prevent leakage of the liquid. The vacuum further allows system 100 to be placed with open portion of first vessel 110 at various orientations.

At 330 of method 300, filling the first vessel with a liquid is accomplished. Referring again to FIG. 1A, first vessel 110 is filled with liquid 125 via a liquid port 120 connected to a source of liquid. Liquid 125 can be water, for example, deionized water, or an oil, such as a mineral oil or a nonconductive oil. Liquid 125 serves as a medium to generate and propagate a compression wave generated by the underwater spark discharge. First vessel 110 can optionally be filled with the liquid to a pressure up to about 100 psi, for example from about 5 to about 90 psi, or from about 10 to about 75 psi. The pressure within first vessel 110 can increase an amplitude of the compression wave generated at 340 of method 300 below. System 100 can also optionally include additional liquid ports, for example, to increase the speed of filling and emptying vessel 110 and/or to prevent contamination of the source of liquid due to breakdown of the liquid by the plasma. System 100 can also optionally include an air vent configured allow removal of air, for example, air bubbles, from vessel 110. Valves capable of withstanding the stress wave generated by system 100 can be used to close off system 100 at the air vent, liquid port(s) 120, and/or vacuum port 170. Examples of suitable valves include, but are not limited to, actuated valves and mechanical valves.

At 340 of method 300, transmitting an electrical pulse to a pair of electrodes immersed in the liquid in first vessel 110 to initiate a spark discharge is performed. Referring again to FIG. 1A, a pair of electrodes 180 is immersed in liquid 125 within first vessel 110. Pair of electrodes 180 can be, for example, part of a conventional spark plug for a combustion engine. In other implementations, the pair of electrodes can be replaced or modified to generate different pulse widths, electrical arcs with different properties, stress waves with different properties, or a combination thereof. For example, one or both of the electrodes of the pair of electrodes can be replaced with different electrode(s) that are made of a different material and/or have a different size/shape. In addition, the positioning of the electrodes, for example, an electrode gap length between the electrodes can be varied to alter and/or control the plasma. For example, the electrode gap length between the pair of electrodes and/or the liquid density can selected or modified to control the spark discharge which affects parameters of the compression wave, for example, its pulse width, frequency, and power (dB).

The electrical pulse is provided by a power supply 185, for example, a bank of capacitors, a voltage induction source, or voltage switching source, provides a voltage capable of bridging the gap length of the pair of electrodes forming an underwater plasma that generates a high amplitude, short wavelength compression wave. The high amplitude, short wavelength compression wave can have a pulse width of about 100 ns to about 300 ns and an energy of about 0.5 to about 10 Joules. Power supply 185 can provide, for example, about 40 kV to about 55 kV to pair of electrodes 480 to generate the underwater plasma and the resulting compression wave having a frequency 0.5 MHz to 5 MHz. Generation of the compression wave is detected by first ultrasonic detector 201.

Although not wishing to be bound by any particular theory, it is believed that the electrical pulse when transferred to the pair of electrodes causes a high intensity electric field across the electrode gap length of the pair of electrodes within the liquid. This results in ionization of the liquid molecules and formation of a gaseous plasma. High temperature and pressure generated by the plasma and opposed by the liquid, results in an acoustic wave, e.g., a compression wave, that propagates outwards with an amplitude sufficient to change the density of the liquid.

Synchronization circuit 186 controls waveform capture display 187 and driver 189 to synchronize and gate generation of the compression wave and data capture by first ultrasonic detector 201, second ultrasonic detector 202, and third ultrasonic detector 203. Synchronization circuit 186 gates data acquisition including sampling frequencies, compression wave generation, and the time of travel of the compression wave. Gating of signals allows determination of the amount of time it takes for the compression wave to travel before being detected by first ultrasonic detector 201, second ultrasonic detector 202, and third ultrasonic detector 203.

At 350 of method 300, detecting of the compression wave by the ultrasonic detectors is performed. The compression wave generated by the plasma propagates through liquid 125 and into first workpiece 191 of structure 190. A portion of the compression wave propagates through first workpiece 191, gap 193, and second workpiece 192 and is detected by second ultrasonic detector 202. This configuration is also referred to herein as pitch-catch.

Another portion of the compression wave propagates through first workpiece 191 and reflects one or more times from the interface between first workpiece 191 and gap 193. For example, this portion of the compression wave can propagate from liquid 125 through a thickness of first workpiece 191 to reflect from the interface between first workpiece 191 and gap 193. The reflected compression wave can then propagate back through the thickness of first workpiece 191 towards the opposite side of first workpiece 191. At the opposite side of workpiece 191, the compression wave can reflect from the surface back through the thickness of first workpiece 191 towards the interface between first workpiece 191 and gap 193. These reflections propagating through the thickness of first workpiece 191 can occur one or more times until the reflected compression wave is optionally detected by third ultrasonic detector 203. This configuration is also referred to herein as pulse-echo.

At 360 of method 300, determining a gap width of gap 193 can be performed. Based on data collected from first ultrasonic detector 201 and second ultrasonic detector 202, the time for the compression wave to propagate through first workpiece 191, gap 193, and second workpiece 192 can be determined. Knowing the speed of travel of the compression wave through first workpiece 191 and second workpiece 192 and the thickness of first workpiece 191 and second workpiece 192, the width of gap 193 can be calculated. The speed of travel of the compression wave can be already known or determined based on data collected from first ultrasonic detector 201 and third ultrasonic detector 203. The width of gap 193 can be determined, for example, by a computing system including at least one processor, a memory including instructions for the at least one processor, one or more input/output devices, and a bus connecting the memory and the one or more input/output devices with the at least one processor, wherein the instructions configure the computing system to calculate the gap width based on signals detected by the first, second, and third ultrasonic transducers and the speed of travel of the compression wave within the workpieces.

Figure 4:
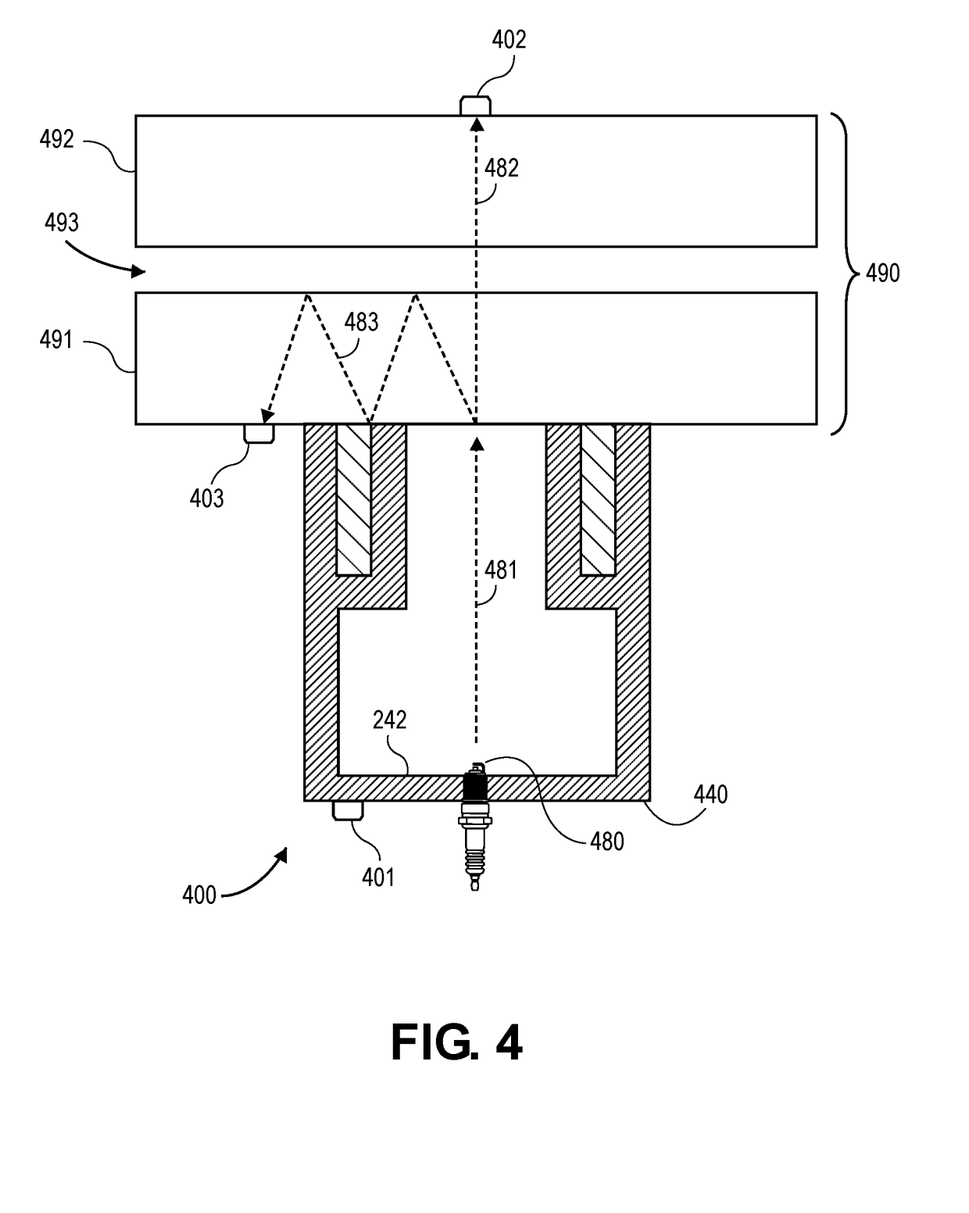
FIG. 4 schematically illustrates a path of a compression wave during determination of a gap width in a structure, according to an implementation.

As an example, determination of the width of an air gap between two CRFP (graphite epoxy) workpieces forming a portion of a fuselage of a commercial aircraft using the devices and methods disclosed herein was conducted. FIG. 4 schematically illustrates a portion of a fuselage 490 including a first CFRP workpiece 491, a second CFRP workpiece 492, and an air gap 493 between first CFRP workpiece 491 and second CFRP workpiece 492. The air gap had a width of 0.010 inches. First CFRP workpiece 491 had a thickness of 0.025 inches and second CFRP workpiece 492 had a thickness of 0.25 inches. Dimensions shown in FIG. 4 are not to scale to better illustrate the propagation path of the compression wave through portion of fuselage 490. At time $T_1$ a system 400 generated a compression wave within a first vessel 440 using a spark discharge from pair of electrodes 480. A capacitor bank and a modular impulse generator, EMC-Partner Model 4830 (Laden, Switzerland), provided the current to the pair of electrodes. The current was measured by a Yokogawa Model DL850 ScopeCorder (Tokyo, Japan). The pair of electrodes were part of an automotive spark plug disposed in water within first vessel 440. Generation of the compression wave at time $T_1$ was detected by a first ultrasonic sensor 401. First ultrasonic sensor 401 was a piezoelectric transducer having a frequency range of 1 MHz to 5 MHz. After generation, the compression wave propagated along path 481, represented by the dotted line, through the liquid within first vessel 440 to couple into first workpiece 491. Once coupled into first CFRP workpiece 491, a portion of the compression wave propagated along path 482 through a thickness of first CFRP workpiece 491, through a thickness, also referred to herein as the width, of gap 493, and through a thickness of second CFRP workpiece 492, to be detected at a time $T_2$ by second ultrasonic sensor 402. Second ultrasonic sensor 402 was a piezoelectric transducer having a frequency range of 1 MHz to 5 MHz. In this pitch-catch configuration, second ultrasonic sensor detected compression wave after it passes through first CFRP workpiece 491, gap 493, and second CFRP workpiece 492 without reflection.

Upon coupling into first workpiece 491, another portion of the compression wave propagated along path 483. The compression wave that propagated along path 483 traveled through the thickness of first CFRP workpiece 491 and reflected from the interface between first CFRP workpiece 491 and gap 493 to again travel through the thickness of first CFRP workpiece 491. Because the speed of the compression wave through the graphite epoxy composite forming first workpiece 491 and second workpiece 492 was known to be 0.1200 in/μsec (3070 m/sec), a third ultrasonic sensor was not used in this experiment.

However, after this first reflection, the compression can be optionally detected by third ultrasonic detector 403 at time $T_3$. As disclosed herein, third ultrasonic sensor 403 can be a piezoelectric transducer having a frequency range of 1 MHz to 5 MHz. Alternatively, as shown in FIG. 4, the compression wave can reflect from the surface of first CFRP workpiece 491 and travel back though the thickness of first CFRP workpiece 491 to again reflect from the interface between first CFRP workpiece 491 and gap 493. After this second reflection from the interface between first CFRP workpiece 491 and gap 493, the compression wave can travel through the first CFRP workpiece 491 to be detected by third ultrasonic detector 403 at time $T_3$. One of ordinary skill in the art will understand that the compression wave can reflect from the interface between first CFRP workpiece 491 and gap 493 one or more times before being detected by third ultrasonic detector 403.

Data acquisition, analysis, and visual display of signals from ultrasonic detectors 401 and 402 was accomplished by an Olympus Focus PX Phased Array Instrument (Tokyo, Japan) acting as the synchronization circuit and a laptop computer. The laptop computer visually displayed a waveform representing the signal detected by second ultrasonic detector 402 that included when the compression wave entered first workpiece 491, left first workpiece 491, entered second workpiece 492, and left second workpiece 492. The speed of the compression wave through the graphite epoxy composite forming first workpiece 491 and second workpiece 492 was known to be 0.1200 in/μsec (3070 m/sec). Using the thickness of first workpiece 491 and second workpiece 492, and the speed of travel of the compression wave through first workpiece 491 and second workpiece 492, the width of gap 493 was determined to be 0.010 inches by the computing system. The speed of travel of the compression wave through first workpiece 491 and second workpiece 492 can also be determined by the signal detected by first ultrasonic detector 401 and third ultrasonic detector 403. Alternatively, if the speed of travel of the compression wave through the material forming first workpiece 491 and second workpiece 492 is previously known, the signal detected by first ultrasonic detector 401 and third ultrasonic detector 403 can be used to confirm the previously known speed.

Further, the disclosure comprises examples according to the following clauses:

Clause 1. A system for measuring a gap width in a structure comprising: a first vessel comprising, one or more sidewalls and an endwall, a liquid port configured to connect to a source to fill the first vessel with a liquid, and an open portion configured to be placed against a structure; a second vessel surrounding the first vessel, comprising a vacuum port configured to connect to a vacuum system to pull a vacuum in a space between an outer surface of the first vessel and an inner surface of the second vessel when the open portion of the first vessel and an open portion of the second vessel are adjacent to the structure; a pair of electrodes disposed within the first vessel; a power supply connected to the pair of electrodes, wherein the power supply is configured to provide an electrical pulse to create an underwater plasma between the pair of electrodes to generate a compression wave; a first ultrasonic detector configured to detect generation of the compression wave; a second ultrasonic detector positioned in a pitch-catch orientation with the pair of electrodes and the structure; and a synchronization circuit configured to synchronize the electrical pulse and the first and second and ultrasonic detectors.

Clause 2. The system of claim 1, further comprising one or more seals to seal the first vessel against the structure when the vacuum is pulled in the space between the outer surface of the first vessel and the inner surface of the second vessel.

Clause 3. The system of claim 1 or 2, wherein the pair of electrodes comprises an anode and a cathode separated by a gap length, and wherein the electrical pulse provided by the power supply bridges the liquid between the gap length to generate the underwater plasma.

Clause 4. The system of any of claims 1-3, wherein the power supply provides about 10 kV to about 60 kV to the pair of electrodes.

Clause 5. The system of claim 1, further comprising a third ultrasonic detector positioned in a pulse-echo orientation with the pair of electrodes and the structure.

Clause 6. The system of any of claims 1-5, wherein the first ultrasonic detector and the second ultrasonic detector each comprise a piezoelectric transducer having a frequency ranging from 0.5 MHz to 5 MHz.

Clause 7. The system of any of claims 1-6, wherein the liquid port is configured to connect to a source of water, deionized water, mineral oil, or a non-conductive fluid.

Clause 8. The system of system of any of claims 1-7, further comprising an additional liquid port, an air vent, or both and additional liquid port and an air vent.

Clause 9. The system of any of claims 1-8, wherein the first vessel and the second vessel comprise a common endwall.

Clause 10. The system of any of claims 1-9, wherein an end of the one or more sidewalls of the first vessel comprise a shape and/or curvature to match a shape and/or curvature of a surface of the structure.

Clause 11. The system of any of claims 1-10, wherein the third ultrasonic detector is positioned on a first portion of the structure, wherein the structure comprises the first portion and a second portion separated by a gap having a width.

Clause 12. The system of any of claims 1-11, wherein the second ultrasonic detector is positioned on the second portion of the structure.

Clause 13. A method for determining a gap width in a structure, comprising: placing an open portion of a first vessel against the structure; pulling a vacuum between an outer surface of the first vessel and an inner surface of a second vessel that encloses the first vessel, wherein pulling the vacuum seals the first vessel to the structure; filling the first vessel with a liquid, wherein the liquid contacts a surface of the structure at the open portion; initiating a spark discharge in the liquid to form a plasma that generates a compression wave in the liquid, wherein the compression wave propagates from the liquid into the structure through the open portion; detecting, by a first ultrasonic transducer, generation of the compression wave; detecting, by a second ultrasonic transducer, the compression wave subsequent to the compression wave passing through a first portion of the structure, a second portion of the structure, and a gap between the first portion and the second portion of the structure; and determining the gap width from detection of the compression wave by one or more of the first, second, and third ultrasonic transducers.

Clause 14. The method of claim 13, wherein initiating the spark discharge in the liquid to form the plasma generates a compression wave in the liquid having a frequency of about 0.5 MHz to about 5 MHz.

Clause 15. The method of claim 13 or 14, wherein initiating the spark discharge in the liquid to form the plasma generates a compression wave in the liquid having a frequency of about 0.5 MHz to about 5 MHz.

Clause 16. The method of any of claims 13-15, wherein initiating a spark discharge in the liquid comprises providing an electrical pulse from a bank of capacitors to a spark plug.

Clause 17. The method of any of claims 13-16, further comprising detecting, by a third ultrasonic transducer, the compression wave subsequent to reflection from the gap between the first portion and the second portion of the structure;.

Clause 18. The method of any of claims 13-17, wherein the structure comprises a composite, a metal, a carbon fiber reinforced plastic or combinations thereof.

Clause 19. The method of any of claims 13-18, wherein the gap between the first portion and the second portion of the structure has a width of about 25 microns to about 250 microns.

Clause 20. A system for measuring a gap width in a composite material comprising: a first vessel comprising, one or more sidewalls and an endwall, a liquid port configured to connect to a source to fill the first vessel with a liquid, and an open portion configured to be placed against a composite material to be inspected; a second vessel surrounding at least a portion of the first vessel, the second vessel comprising a vacuum port configured to connect to a vacuum system to pull a vacuum in a space between an outer surface of the first vessel and an inner surface of the second vessel when the open portion of the first vessel and an open portion of the second vessel are aligned to be placed against a surface of the composite material; a pair of electrodes disposed within the first vessel and positioned to generate a compression wave in the liquid within the first vessel directed towards the composite material when supplied with an electrical pulse from a power supply; a first ultrasonic transducer for detecting generation of the compression wave; a second ultrasonic transducer for detecting the compression wave subsequent to the compression wave passing through a cross-section of the composite material; a third ultrasonic transducer for detecting reflection of the compression wave from an interface between a portion of the composite material and an air gap within the composite material; a synchronization circuit configured to synchronize generation of the compression wave and detection of the compression wave by the first, second, and third ultrasonic transducers; and a computing system comprising at least one processor, a memory including instructions for the at least one processor, one or more input/output devices; and a bus connecting the memory and the one or more input/output devices with the at least one processor, wherein the instructions configure the computing system to calculate the gap width based on signals detected by the first, second, and third ultrasonic transducers.

Notwithstanding that the numerical ranges and parameters setting forth the broad scope of the disclosure are approximations, the numerical values set forth in the specific examples are reported as precisely as possible. Any numerical value, however, inherently contains certain errors necessarily resulting from the standard deviation found in their respective testing measurements. Moreover, all ranges disclosed herein are to be understood to encompass any and all sub-ranges subsumed therein.

While the present teachings have been illustrated with respect to one or more implementations, alterations and/or modifications can be made to the illustrated examples without departing from the spirit and scope of the appended claims. In addition, while a particular feature of the present teachings may have been disclosed with respect to only one of several implementations, such feature may be combined with one or more other features of the other implementations as may be desired and advantageous for any given or particular function. As used herein, the terms "a", "an", and "the" may refer to one or more elements or parts of elements. As used herein, the terms "first" and "second" may refer to two different elements or parts of elements. As used herein, the term "at least one of A and B" with respect to a listing of items such as, for example, A and B, means A alone, B alone, or A and B. Those skilled in the art will recognize that these and other variations are possible. Furthermore, to the extent that the terms "including," "includes," "having," "has," "with," or variants thereof are used in either the detailed description and the claims, such terms are intended to be inclusive in a manner similar to the term "comprising." Further, in the discussion and claims herein, the term "about" indicates that the value listed may be somewhat altered, as long as the alteration does not result in nonconformance of the process or structure to the intended purpose described herein. Finally, "exemplary" indicates the description is used as an example, rather than implying that it is an ideal.

It will be appreciated that variants of the above-disclosed and other features and functions, or alternatives thereof, may be combined into many other different systems or applications. Various presently unforeseen or unanticipated alternatives, modifications, variations, or improvements therein may be subsequently made by those skilled in the art which are also intended to be encompasses by the following claims.

What is claimed is:

1. A system for measuring a gap width in a structure comprising:
   a first vessel comprising,
      one or more sidewalls and an endwall,
      a liquid port configured to connect to a source to fill the first vessel with a liquid, and
      an open portion configured to be placed against a structure;
   a second vessel surrounding the first vessel, comprising a vacuum port configured to connect to a vacuum system to pull a vacuum in a space between an outer surface of the first vessel and an inner surface of the second vessel when the open portion of the first vessel and an open portion of the second vessel are adjacent to the structure;
   a pair of electrodes disposed within the first vessel;
   a power supply connected to the pair of electrodes, wherein the power supply is configured to provide an electrical pulse to create an underwater plasma between the pair of electrodes to generate a compression wave;
   a first ultrasonic detector configured to detect generation of the compression wave;
   a second ultrasonic detector positioned in a pitch-catch orientation with the pair of electrodes and the structure; and
   a synchronization circuit configured to synchronize the electrical pulse and the first and second ultrasonic detectors.

2. The system of claim 1, further comprising one or more seals to seal the first vessel against the structure when the vacuum is pulled in the space between the outer surface of the first vessel and the inner surface of the second vessel.

3. The system of claim 1, wherein the pair of electrodes comprises an anode and a cathode separated by an electrode gap length, and wherein the electrical pulse provided by the power supply bridges the liquid between the electrode gap length to generate the underwater plasma.

4. The system of claim 1, wherein the power supply provides about 10 kV to about 60 kV to the pair of electrodes.

5. The system of claim 1, further comprising a third ultrasonic detector positioned in a pulse-echo orientation with the pair of electrodes and the structure.

6. The system of claim 5, wherein the third ultrasonic detector is positioned on a first portion of the structure, wherein the structure comprises the first portion and a second portion separated by a gap having a width.

7. The system of claim 6, wherein the second ultrasonic detector is positioned on the second portion of the structure.

8. The system of claim 1, wherein the first ultrasonic detector and the second ultrasonic detector each comprise a piezoelectric transducer having a frequency ranging from 0.5 MHz to 5 MHz.

9. The system of claim 1, wherein the liquid port is configured to connect to a source of water, deionized water, mineral oil, or a non-conductive fluid.

10. The system of claim 1, further comprising an additional liquid port, an air vent, or both an additional liquid port and an air vent.

11. The system of claim 1, wherein the first vessel and the second vessel comprise a common endwall.

12. The system of claim 1, wherein an end of the one or more sidewalls of the first vessel comprise a shape and/or curvature.

13. A method for determining a width of a gap in a structure, comprising:
   placing an open portion of a first vessel against the structure;
   pulling a vacuum between an outer surface of the first vessel and an inner surface of a second vessel that encloses the first vessel, wherein pulling the vacuum seals the first vessel to the structure;
   filling the first vessel with a liquid, wherein the liquid contacts a surface of the structure at the open portion;
   initiating a spark discharge in the liquid to form a plasma that generates a compression wave in the liquid, wherein the compression wave propagates from the liquid into the structure through the open portion;
   detecting, by a first ultrasonic transducer, generation of the compression wave
   detecting, by a second ultrasonic transducer, the compression wave subsequent to the compression wave passing through a first portion of the structure, a second portion of the structure, and a gap between the first portion and the second portion of the structure; and
   determining the gap width from detection of the compression wave by one or more of the first and second ultrasonic transducers.

14. The method of claim 13, wherein initiating the spark discharge in the liquid comprises supplying about 10 kV to about 60 kV to a pair of electrodes disposed in the first vessel.

15. The method of claim 13, wherein initiating the spark discharge in the liquid to form the plasma generates a compression wave in the liquid having a frequency of about 0.5 MHz to about 5 MHz.

16. The method of claim 13, wherein initiating a spark discharge in the liquid comprises providing an electrical pulse from a bank of capacitors to a spark plug.

17. The method of claim 13, further comprising detecting, by a third ultrasonic transducer, the compression wave subsequent to reflection from the gap between the first portion and the second portion of the structure.

18. The method of claim 13, wherein the structure comprises a composite, a metal, a carbon fiber reinforced plastic or combinations thereof.

19. The method of claim 13, wherein the gap between the first portion and the second portion of the structure has a width of about 25 microns to about 250 microns.

20. A system for measuring a gap width in a composite material comprising:
   a first vessel comprising,
      one or more sidewalls and an endwall,
      a liquid port configured to connect to a source to fill the first vessel with a liquid, and
      an open portion configured to be placed against a composite material to be inspected;
   a second vessel surrounding at least a portion of the first vessel, the second vessel comprising a vacuum port configured to connect to a vacuum system to pull a vacuum in a space between an outer surface of the first vessel and an inner surface of the second vessel when the open portion of the first vessel and an open portion of the second vessel are aligned to be placed against a surface of the composite material;
   a pair of electrodes disposed within the first vessel and positioned to generate a compression wave in the liquid within the first vessel directed towards the composite material when supplied with an electrical pulse from a power supply;
   a first ultrasonic transducer for detecting generation of the compression wave;
   a second ultrasonic transducer for detecting the compression wave subsequent to the compression wave passing through a cross-section of the composite material;
   a third ultrasonic transducer for detecting reflection of the compression wave from an interface between a portion of the composite material and an air gap within the composite material;
   a synchronization circuit configured to synchronize generation of the compression wave and detection of the compression wave by the first, second, and third ultrasonic transducers; and
   a computing system comprising at least one processor, a memory including instructions for the at least one processor, one or more input/output devices; and a bus connecting the memory and the one or more input/output devices with the at least one processor, wherein the instructions configure the computing system to calculate the gap width based on signals detected by the first, second, and third ultrasonic transducers.

* * * * *